United States Patent [19]
Welsh, Jr. et al.

[11] Patent Number: 5,947,555
[45] Date of Patent: *Sep. 7, 1999

[54] INFANT SEAT AND STROLLER COUPLING SYSTEM

[75] Inventors: Thomas J. Welsh, Jr., Naperville; Peter J. Myers, Wheaton, both of Ill.

[73] Assignee: Kolcraft Enterprises, Inc., Chicago, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/755,319

[22] Filed: Nov. 22, 1996

[51] Int. Cl.⁶ ........................................ A47C 13/00
[52] U.S. Cl. .............. 297/130; 297/256.16; 280/30
[58] Field of Search .................. 297/130, 256.16; 280/30, 643

[56] References Cited

U.S. PATENT DOCUMENTS

| | | | |
|---|---|---|---|
| 4,736,959 | 4/1988 | Van Steenburg | 297/130 X |
| 4,743,063 | 5/1988 | Foster, Jr. | 297/130 |
| 4,872,692 | 10/1989 | Steenburg | 297/130 X |
| 4,878,680 | 11/1989 | Molnar | 280/30 |
| 5,201,535 | 4/1993 | Kato et al. | 297/130 X |
| 5,676,386 | 10/1997 | Huang | 297/256.16 X |

*Primary Examiner*—Laurie K. Cranmer
*Attorney, Agent, or Firm*—Marshall, O'Toole, Gerstein, Murray & Borun

[57] ABSTRACT

Apparatus and method for coupling an infant carrier to a stroller in which the carrier has extensions projecting outward from the carrier side walls and the stroller has guide housings with an open face recess adapted to receive the extensions. An actuation bar located contiguous to the stroller handle bar serves to release biased latch members which lock the carrier extension to the stroller guide housings.

16 Claims, 4 Drawing Sheets

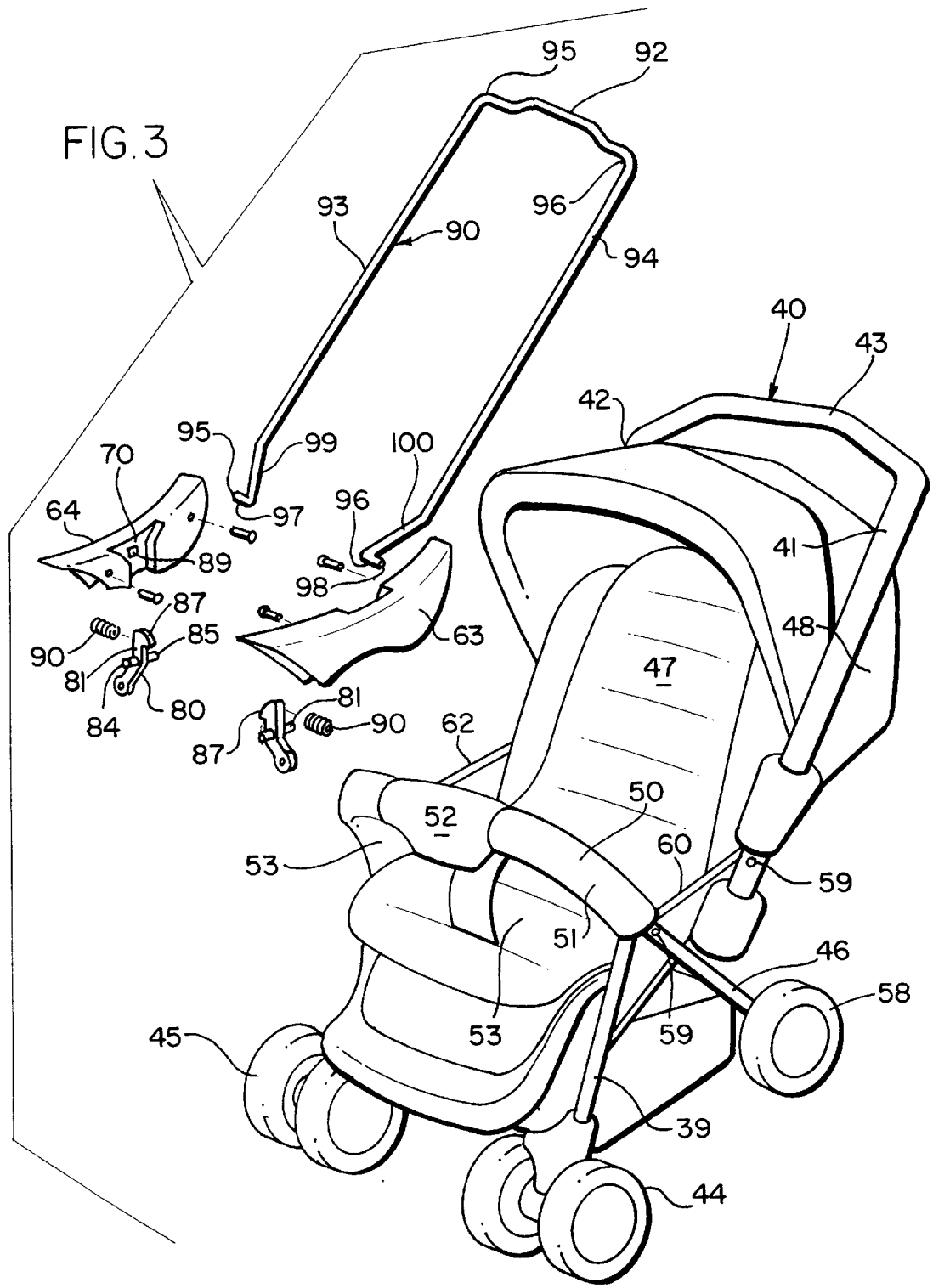

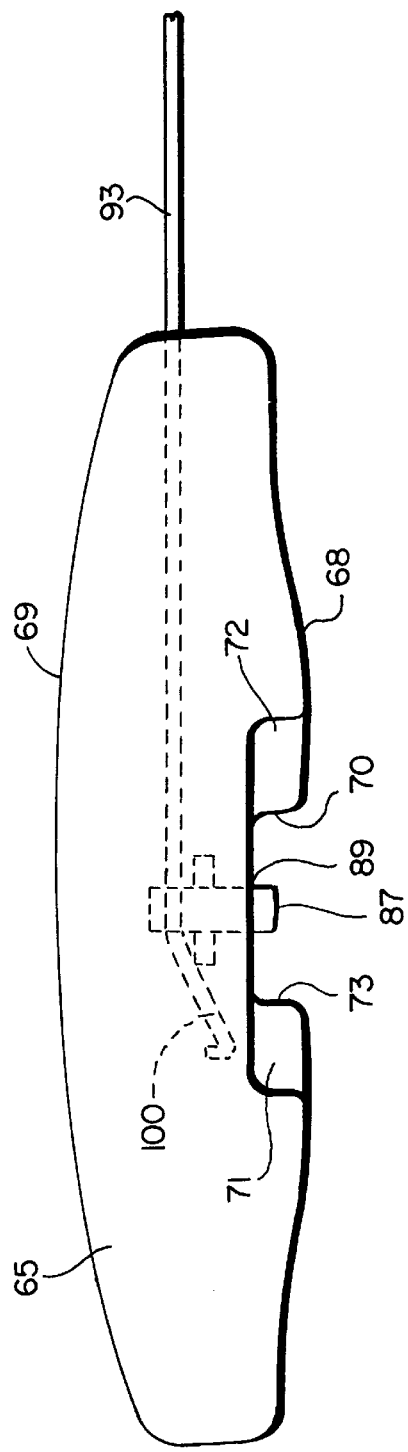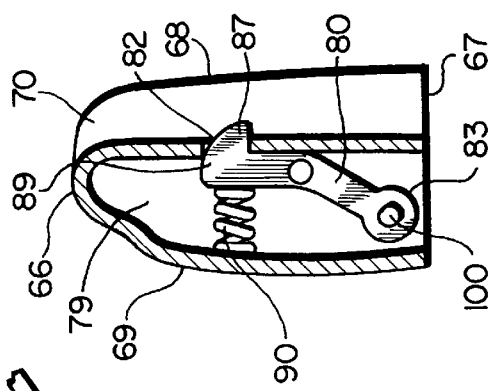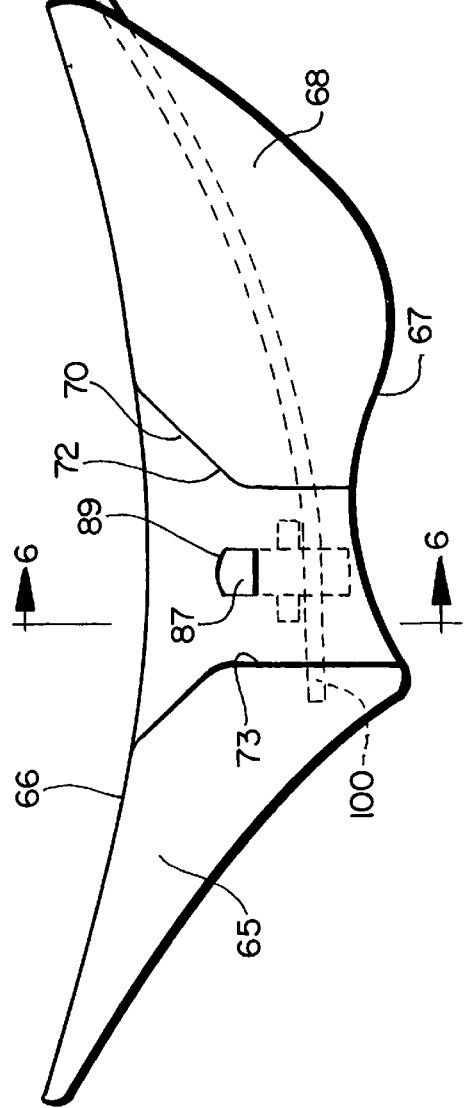

INFANT SEAT AND STROLLER COUPLING SYSTEM

BACKGROUND OF THE INVENTION

The invention disclosed and claimed herein relates generally to apparatus and a system for coupling an infant carrier device to a second device; and, more particularly, the invention relates to releasably attaching an infant carrier to a stroller.

DESCRIPTION OF THE PRIOR ART

Various systems are available for coupling an infant seat carrier to a stroller or other device. There is presently pending application Ser. No. 08/522,135 filed Aug. 31, 1995 and assigned to the assignee of the present application which discloses an infant carrier having a pair of pocket members disposed on the side walls of the infant carrier. The pockets are adapted to seat on or be coupled to corresponding vertical posts disposed on a stroller or other device. While such system and apparatus are satisfactory, it is desired to have a coupling system which can be relatively readily actuated whereby an infant carrier can be easily removed from the stroller. Moreover, it is desired that the carrier be relatively easily disposed or coupled to the stroller with the carrier being releasably locked in position.

Additionally, various strollers are available in the marketplace which utilize secondary attachments which permit an infant seat to be coupled to the stroller. Unfortunately, in some instances, these systems utilize attachment devices which are overly complicated or require the use of tools to convert the stroller to accept the infant seat. In other instances, the mechanism for locking the infant seat carrier and stroller are too bulky or undesirably heavy. There are other devices which include one-handed release mechanisms on the market. However, in other instances, the lock mechanism is inconveniently located under the infant seat or is very cumbersome to use as one must bend or otherwise move to an undesired position to release the lock mechanism.

What is desired is to have an infant seat carrier which can relatively easily be attached to a stroller or other second device such as, but not limited to, a stroller. It also is desired to have a locking mechanism which can be actuated to release a latching means between the infant carrier and stroller where the release is disposed at a distance away from the location of the carrier seat/stroller connection, as, for example, at the stroller handle position.

SUMMARY OF THE INVENTION

The invention disclosed and claimed herein serves to obviate the problems or disadvantages sometimes associated with the prior art while at the same time achieving the desired features for coupling an infant car seat to a stroller or other second device.

Briefly, the infant seat/stroller coupling system disclosed and claimed herein utilizes a conventional infant carrier having an extension preferably in the form of a pocket or post member projecting outwardly from each side wall of the carrier. A stroller having a pair of guide housings, which correspond to the carrier posts or pockets, each have an open face recess adapted for receiving and guiding the infant carrier posts or pockets into the desired coupled position. Once the infant carrier extensions are disposed within the stroller guide housings, a latch mechanism is actuated whereby a biased latch member locks one or both extensions within a stroller guide housing. The coupling system of the present invention permits a carrier to be relatively easily and readily guided into a coupling position with a stroller for transporting an infant or toddler (hereafter infant stroller).

When it is desired to remove the infant carrier from the stroller, one need only pull on a release bar located near the stroller handle bar, whereupon the biased latch member is released and the carrier can be removed from the stroller simply by manually lifting the infant carrier handle upward and withdrawing the carrier extensions from the stroller guide housings.

The device of the present invention requires no secondary locks on the infant seat to attach it to the stroller. Moreover, the stroller guide housings are configured to have a ramped, open face recess so that the infant carrier can be relatively easily guided into position. All one need do is position the seat over the stroller and allow it to slide by the ramped recess into position.

The release lock mechanism of the present invention preferably comprises a pair of biased pivotable latch members. A U-shaped wire form is attached to each pivotable latch member. The wire form includes a release bar which is contiguous to the stroller handle and is easily accessible to a user. To release the latch members, one pulls on the release bar which causes the latch member to disengage the infant seat posts or pockets from the stroller guide housings. Moreover, in the event an operator of the stroller inadvertently releases the bar, the spring biased latch members automatically reengages the infant seat.

BRIEF DESCRIPTION OF THE DRAWINGS

FIG. 3 shows a perspective view of a stroller and coupling components for coupling an infant carrier to a stroller;

FIG. 4 shows a plan view of a stroller guide housing;

FIG. 5 shows a front view of the stroller guide housing of FIG. 4; and,

FIG. 6 shows a cross section view of the stroller guide housing of FIGS. 4 and 5 taken along lines 6—6 in FIG. 5.

DETAILED DESCRIPTION

Figure 1:
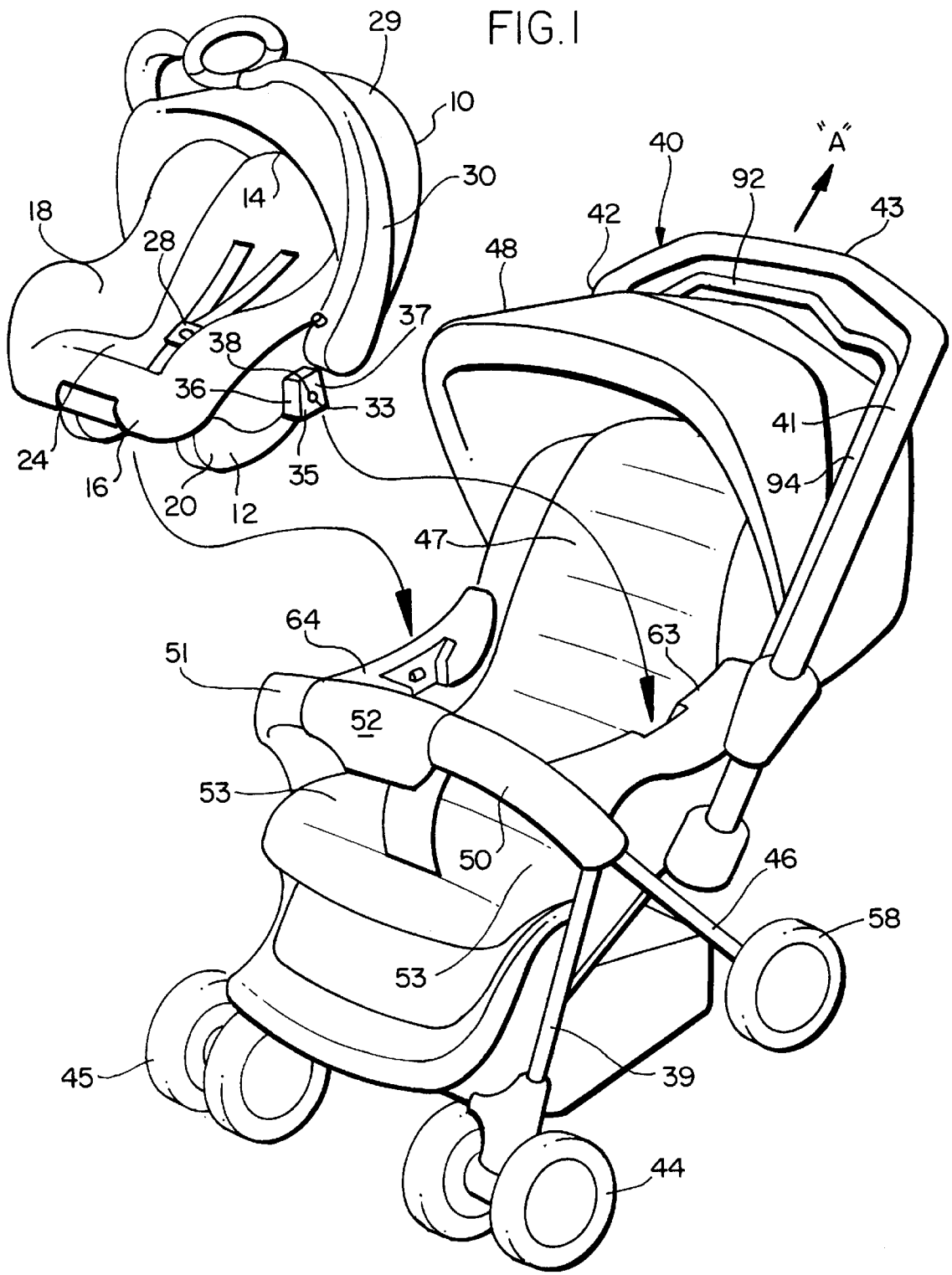
FIG. 1 shows a perspective view of an infant carrier disposed to be seated and locked in an infant stroller in accordance with the present invention.
Figure 2:
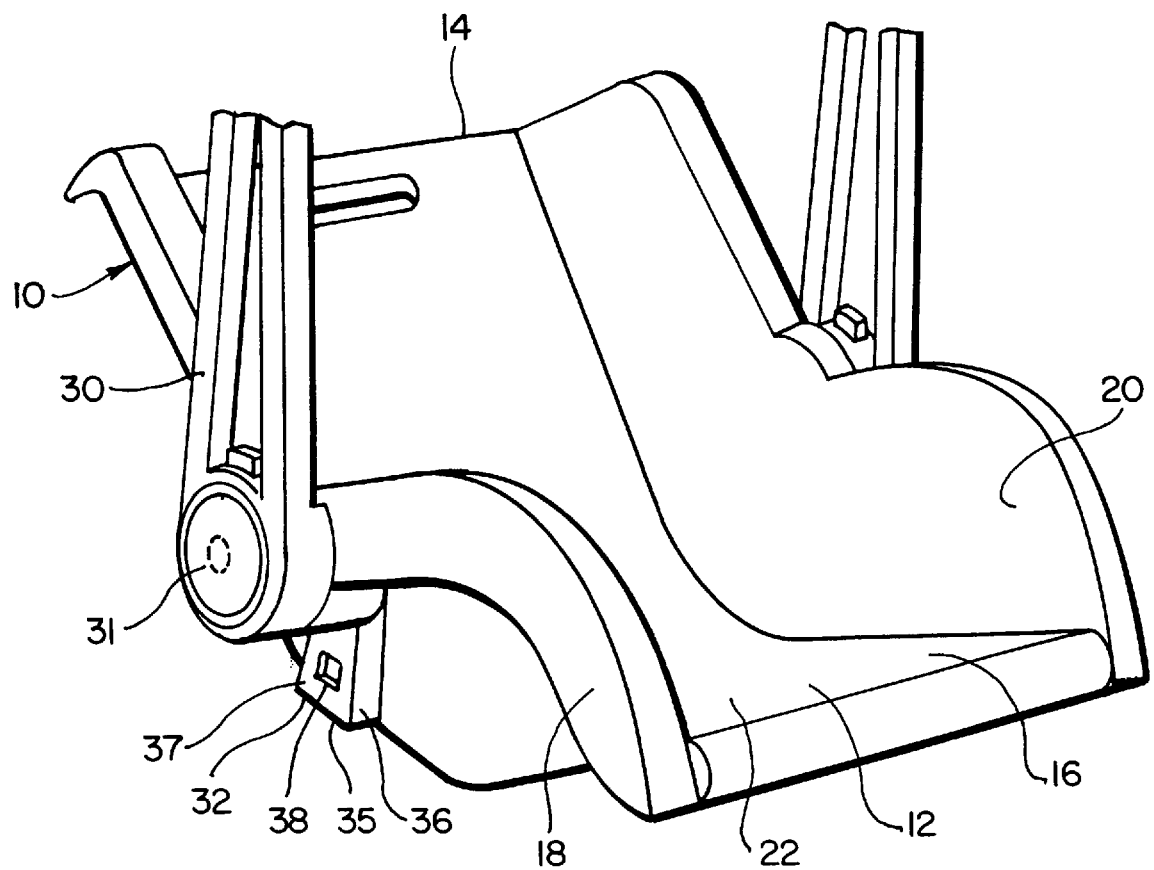
FIG. 2 shows a partial perspective view of an infant carrier having pocket members adapted to releasably sea t in guide housings on a stroller.

Referring to FIGS. 1 and 2, carrier 10 is a conventional infant carrier. Carrier 10 often is referred to in the art as an infant car seat. It is to be understood that carrier 10, as disclosed and claimed herein, can be utilized and referred to, if desired, as an infant car seat. Carrier 10 includes shell 12 extending from head end 14 to foot end 16 and normally is of a length which is substantially greater than its width. Side walls 18, 20 extend upwardly from the side edges of portion 22 and serve to restrain an infant from excessive lateral movement. Shell 12 is contoured along its length in a serpentine manner to provide for greater infant comfort. A soft pad 24, such as illustrated in FIG. 1, is disposed within the shell and an infant is placed upon the pad. A plurality of buckles and belts 28 normally are employed to further restrain an infant in the carrier. If desired, a canopy 29 can be attached to the carrier, such as shown in FIG. 1, to shield an infant from the elements.

Carrier 10 also includes a handle 30 which is illustrated in an inverted U-shaped configuration. The handle is coupled to the carrier by suitable pins 31 such as illustrated in FIG. 2 which extend through the sides of the carrier near the central portion of its length.

Carrier 10 preferably is fabricated or otherwise molded from a rigid, impact resistant, high polymer plastic such as polyethylene, polyvinyl chloride or the like.

Carrier 10 also includes a pair of coupler members or extensions 32, 33 located on side walls 18, 20. Each extension preferably comprises a mounting pocket or post 35 formed on and projecting outwardly from the outer surfaces of carrier side walls 18, 20. Specifically, pocket 35 is formed by a U-shaped member comprising side members 36 and base 37. A pocket preferably is integrally molded with and extends laterally outward from a side wall. The base member includes a latch hole or opening 38 to be discussed hereafter.

Stroller 40 is a conventional stroller and comprises a first pair of spaced tubular frame members 41, 42, which are connected together at one end by stroller handle bar 43. Wheels 44, 45 extend from the open ends of a second pair of tubular frame members 39 only one of which is shown. A third pair of tubular frame members 46, only one of which is shown, extend from members 39 and a second pair of wheels 58, only one of which is shown, is connected to the outboard end of the third pair of frame members 46. A pad 47 is disposed on a stroller wall which extends along a substantial length from the head end to the foot end of the stroller. If desired, a weather canopy 48 can be attached to the stroller. A napper bar 50 having a cushioning pad 51 disposed thereon traverses stroller 40. A flexible plastic or fabric strip of material 52 connects napper bar 50 to pad 47 to provide leg openings 53 for an infant when disposed in stroller 40. As previously mentioned, the stroller can be any conventional stroller as the invention disclosed herein is not to a stroller per se.

Referring to FIG. 3, mounting tube or bar 60 is fastened at its respective end by rivets 59 or other suitable fastening means to stroller frame members 41 and 46. Similarly, mounting tube 62 also is riveted or otherwise fastened to frame members 42 and 46.

A first carrier guide housing 63 is fixedly disposed by any suitable fastening means, such as rivets, on mounting tube 60 whereas guide housing 64 is similarly fixed to mounting tube 62. Guide housing 64 is a mirror image of guide housing 63. Each housing, as seen in FIGS. 4–6, includes a guide member 65 having a top 66, bottom 67, inner side wall 68 and outer side wall 69. Side wall 68 includes an open face recess 70 which is sized and configured to receive a carrier extension 32 or 33 which can be dropped or otherwise positioned into recess 70. As noted, recess 70 preferably has an open face and includes radiused or ramped portions 71, 72 and straight portion 73. What is desired by ramped is that the face has a slope, curve, and/or radius at the area of 71, 72 to assist in guiding so that as an extension 32 or 33 is placed in a guide housing recess, it can be guided into its final position by sliding it along ramped recess portions 71 or 72.

A latch mechanism 80 is located within each guide housing 63, 64. Mechanism 80 includes latch member 81 which is elongated and preferably molded of a rigid plastic material having top end 82 and bottom end 83. Member 81 includes a pair of lateral posts 84, 85 which are received in suitable openings located in the guide housings 63, 64. Latch member 81 is adapted to rotate within a pocket 79 formed in the guide housing, FIG. 6, whereby top end 82 of latch member 81, which includes latch catch 87, is adapted to extend through housing opening 89.

Compression spring 90, FIG. 3, has one end fastened to the bottom end 83 of latch member 81 while the remaining spring end is fastened to a suitable post, not shown, disposed within a guide housing. As a result, latch member 81, which rotates about posts 84, 85, is biased so that latch catch 87 normally extends or projects through housing opening 89. When carrier pocket of post is disposed in housing recess 70, latch catch 87 extends into carrier pocket latch opening 38 whereby carrier 10 can be positively locked in position on stroller 40.

A U-shaped release wire form bar or tube 90 is disposed on stroller 40. Release 90 includes base 92 and two legs 93, 94. Each leg has one end which terminates as an end of base 92 and another end 95, 96 which terminates as a tab 97 or 98. Leg segments 99, 100 are tapered so that, inserted within a guide housing, each segment projects toward recess 70 as seen in FIGS. 3 and 4. Tabs 97, 98 and segments 99, 100 are adapted to be inserted in holes 83 of latch members 81. Release bar or tube 90 is attached to stroller 40 as illustrated in FIG. 1 whereby legs 93, 94 are disposed substantially parallel to respective stroller frame members 41, 42. Base 92 is positioned contiguous to stroller handle bar 43 such that an individual can readily pull on release bar 90 without releasing the operator's hands from the stroller handle bar. Release bar 90 can be attached in any suitable manner to stroller frame members 41, 42. If desired, legs 93, 94 can be positioned to slide within a tubular bracket attached to each stroller frame member.

In operation, as one pulls release bar 90 in the direction of arrow "A" toward stroller handle bar 43, latch members 81 are rotated about posts 84, 85 such that latch catch 87 pulls away from housing opening 89 and carrier pocket opening 38 whereby carrier 10 is radiused from stroller 40 and can be removed by lifting upward from guide housings 63, 64.

Carrier 10 can easily be placed over stroller 40 as illustrated in FIG. 1. The carrier is aligned so that carrier posts or pockets 35 will slide along the ramped recesses 70 of stroller guide housings 64, 65. Once in position, each latch catch 87 on biased latch member 81 enters a carrier pocket opening 38 to lock carrier 10 onto stroller 40. As discussed above, carrier 10 is released from stroller 40, first by pulling on release bar 92 and, once latch catches 87 are removed from openings 38, carrier 10 is lifted out of guide recess 70.

If desired, extensions 32, 33 could be disposed on the guide housings and the recesses 70 could be utilized on carrier 10.

While the present invention has been described in connection with a single embodiment, it will be understood to those skilled in the art that many changes and modifications may be made without departing from the true spirit and scope of the invention. It is therefore intended by the appended claims to cover all such changes and modifications which come within the true spirit and scope of the invention.

What is claimed is:

1. Coupling apparatus for an infant carrier and stroller, said apparatus comprising:

an infant carrier having a head end, foot end and a pair of spaced side walls, each carrier side wall having an extension projecting outwardly therefrom;

a stroller including a pair of spaced guide housings, each guide housing having a recess dimensioned to receive one of the carrier extensions;

a generally U shaped handle coupled to said stroller, said handle including two legs and a handle bar connecting the two legs, the handle bar being adapted to be gripped by an individual;

a latch mechanism having a releasable latch member for latching said carrier to said stroller, said mechanism being located where one of the extensions is received in one of the recesses; and, an actuation device including a generally U shaped latch release bar having two legs and a base connecting the legs, wherein the U shaped latch release bar is generally parallel to the U shaped handle member, the base of the release bar being movable relative to said handle bar for actuating said latch mechanism to release said latch member whereby said carrier and extensions can be removed from said guide housing recesses, the base of the release bar being positioned relative to the handle bar such that an individual can actuate the release bar with a hand while simultaneously gripping the handle bar with the same hand.

2. Coupling apparatus in accordance with claim 1 wherein said extension includes an opening therein and said latch member includes a latch catch adapted to seat in said opening when said carrier extension is inserted in said stroller guide housing.

3. Coupling apparatus in accordance with claim 1 wherein said latch member is pivotable relative to said guide housing and said latch member is biased.

4. A coupling system in accordance with claim 1 wherein said extension comprises a pocket.

5. A coupler system in accordance with claim 1 wherein said extension comprises a post.

6. Coupler apparatus in accordance with claim 1 wherein said recess has an open face.

7. Coupler apparatus in accordance with claim 1 wherein said recess is ramped.

8. An apparatus comprising:

an infant carrier including a head end, foot end, spaced side walls connecting said head and foot ends and an extension extending outwardly from each carrier side wall;

a stroller having a frame and including a pair of guide housings fixed to said frame, said guide housings each having an open-faced recess configured to receive a carrier extension;

a handle joined to said stroller frame, said handle including a handle bar positioned at a height to facilitate gripping by an upright standing individual, the handle bar having a length;

said carrier extensions each being disposed within one of said recesses;

a latch mechanism located at each guide housing having a releasable latch member for latching said carrier to said stroller;

each of said latch members being biased within its respective guide housing and releasably connected to one of said carrier extensions whereby said extension is locked in said guide housing; and, an actuation device attached to said stroller and including a movable latch release bar having a length, the length of the latch release bar being located immediately adjacent the length of said stroller handle bar and being movable relative to said handle bar, said actuation device being connected to said latch mechanism whereby upon actuation of said release bar, said latch members are disengaged from said carrier extensions and said carrier is adapted to be removed from said stroller, said release bar being actuable by squeezing the release bar and the handle bar together with a single hand.

9. An apparatus coupled to a stroller in accordance with claim 8 wherein said extension comprises a pocket.

10. An apparatus coupled to a stroller in accordance with claim 8 wherein said extension comprises a post.

11. An apparatus in accordance with claim 8 wherein said extension includes an opening therein and said latch member includes a latch catch adapted to seat in said opening when said carrier extension is inserted in said stroller guide housing.

12. An apparatus in accordance with claim 8 wherein said latch member is pivotable relative to said guide housing and said latch member is biased.

13. An apparatus in accordance with claim 8 wherein said actuation device is a U-shaped release device comprising said release bar, wherein said release bar two ends and two legs which extend outwardly from said release bar.

14. For use with an infant carrier, a stroller comprising:

a stroller frame dimensioned to receive the infant carrier;

a pair of handle support arms connected to said stroller frame, said handle support arms supporting a non-telescoping handle bar having a length disposed in a generally horizontal position at a height to be gripped by an individual standing upright;

a latch mechanism for latching said infant carrier to said stroller; and, a latch release bar having a length disposed immediately adjacent to the length of said stroller handle bar such that the upright standing individual can simultaneously grip the release bar and the handle bar with a single hand to move the release bar relative to said handle bar to actuate said latch mechanism such that said infant carrier can be removed from said stroller.

15. For use with an infant carrier, a stroller comprising:

a wheeled frame dimensioned to receive the infant carrier;

a latch for releasably securing the infant carrier to the frame;

a handle including a generally horizontal handle bar having a length positioned at a height for gripping by an upright standing individual pushing the stroller; and a release bar cooperating with the latch and having a generally horizontal release base having a length located remotely from the latch wherein said length of said release base is positioned immediately adjacent to the length of the handle bar such that the standing individual can actuate the latch via the release base with a single hand simultaneously gripping the handle bar.

16. For use with an infant carrier, a stroller comprising:

a wheeled frame dimensioned to receive the infant carrier;

a latch associated with the frame for releasably securing the infant carrier to the frame;

a handle coupled to the frame, the handle having an inner surface generally defining a first U wherein the first U comprises a base and two legs; and an actuator having an outer surface generally defining a second U wherein the second U comprises a base and two legs, the outer surface of the actuator being dimensioned to be slidable immediately adjacent the inner surface of the handle, the actuator cooperating with the latch such that sliding the base of the actuator toward the base of the handle releases the infant carrier for removal from the stroller.

* * * * *

UNITED STATES PATENT AND TRADEMARK OFFICE
CERTIFICATE OF CORRECTION

PATENT NO. : 5,947,555  
DATED : September 7, 1999  
INVENTOR(S) : Welsh Jr. et al.

Page 1 of 3

It is certified that error appears in the above-identified patent and that said Letters Patent is hereby corrected as shown below:

On the title page, item [56]    Please insert the following references

| | | | |
|---|---|---|---|
| -- 4,065,177 | 12/1977 | Hyde et al. | 297/327 |
| 4,186,961 | 2/1980 | Farrell, Jr. et al. | 297/216 |
| 4,306,749 | 12/1981 | Deloustal | 297/440 |
| 4,345,791 | 8/1982 | Bryans et al. | 297/250 |
| 4,440,331 | 4/1984 | Schimmels | 224/31 |
| 4,537,414 | 8/1985 | Nusbaum | 280/47.41 |
| 4,555,121 | 11/1985 | Lockard et al. | 280/30 |
| 4,570,956 | 2/1986 | Dyer | 280/30 |
| 4,615,560 | 10/1986 | Schaller | 297/130 |
| 4,632,456 | 12/1986 | Kassai | 297/250 |
| 4,634,177 | 1/1987 | Meeker | 297/250 |
| 4,641,844 | 2/1987 | Mar et al. | 280/30 |
| 4,679,804 | 7/1987 | Johnson | 280/30 |
| 4,681,368 | 7/1987 | Heath et al. | 297/250 |
| 4,685,688 | 8/1987 | Edwards | 280/30 |
| 4,744,599 | 5/1988 | Jankowski et al. | 297/250 |
| 4,750,783 | 6/1988 | Irby et al. | 297/250 |
| 4,754,999 | 7/1988 | Kain | 297/250 |
| 4,762,331 | 8/1988 | Tucker et al. | 280/30 |
| 4,762,364 | 9/1988 | Young | 297/250 |
| 4,768,795 | 9/1988 | Mar | 280/30 |
| 4,786,064 | 11/1988 | Baghdasarian | 280/30 |
| 4,826,246 | 5/1989 | Meeker | 257/250 |
| 4,828,281 | 5/1989 | Sanchas | 280/30 |
| 4,834,403 | 5/1989 | Yanus et al. | 280/30 |
| 4,861,105 | 8/1989 | Merten et al. | 297/250 |
| 4,874,182 | 10/1989 | Clark | 280/30 |
| 4,896,894 | 1/1990 | Singletary | 280/30 |
| 4,903,980 | 2/1990 | Schwartz | 280/647 |
| 4,915,446 | 4/1990 | Darling et al. | 297/250 |
| 4,921,261 | 5/1990 | Sadler, Jr. et al. | 280/30 |
| 4,943,113 | 7/1990 | Meeker | 297/250 |

UNITED STATES PATENT AND TRADEMARK OFFICE
CERTIFICATE OF CORRECTION

PATENT NO. : 5,947,555
DATED : September 7, 1999
INVENTOR(S) : Welsh Jr. et al.

It is certified that error appears in the above-identified patent and that said Letters Patent is hereby corrected as shown below:

| | | | |
|---|---|---|---|
| 4,984,813 | 1/1991 | Takahashi et al. | 280/30 |
| 4,989,888 | 2/1991 | Qureshi et al. | 280/30 |
| 5,022,669 | 6/1991 | Johnson | 280/30 |
| 5,052,750 | 10/1991 | Takahashi et al. | 297/250 |
| 5,104,134 | 4/1992 | Cone | 280/30 |
| 5,106,154 | 4/1992 | Kain | 297/250 |
| 5,121,940 | 6/1992 | March | 280/644 |
| 5,133,567 | 7/1992 | Owens | 280/30 |
| 5,149,113 | 9/1992 | Alldredge | 280/30 |
| 5,188,380 | 2/1993 | Tucek | 280/30 |
| 5,201,535 | 4/1993 | Kato et al. | 280/30 |
| 5,203,577 | 4/1993 | Kato et al. | 280/30 |
| 5,224,720 | 7/1993 | Chaw et al. | 280/62 |
| 5,230,523 | 7/1993 | Wilhelm | 280/30 |
| 5,234,224 | 8/1993 | Kim | 280/30 |
| 5,265,931 | 11/1993 | Ryan | 297/130 |
| 5,277,472 | 1/1994 | Freese et al. | 297/130 |
| 5,318,311 | 6/1994 | Bofill | 280/30 |
| 5,499,831 | 3/1996 | Worth et al. | 280/30 |

Item [56]   References Cited   Please insert the following under FOREIGN PATENT DOCUMENTS:

| | | |
|---|---|---|
| 2,193,692 | 2/1988 | Great Britain |
| 2,254,587 | 10/1992 | Great Britain |
| 2,262,914 | 7/1993 | Great Britain |

UNITED STATES PATENT AND TRADEMARK OFFICE
CERTIFICATE OF CORRECTION

PATENT NO. : 5,947,555
DATED : September 7, 1999
INVENTOR(S) : Welsh Jr. et al.

It is certified that error appears in the above-identified patent and that said Letters Patent is hereby corrected as shown below:

Item [56]  References Cited    Please insert the following under
OTHER PUBLICATIONS:

-- Century Products 1994 Brochure, Pages 46-47, "Century® 4-in-1 System Car Seat/Stroller" and "Century® 4-in-1 Convertible Car Seat/Stroller".

Evenflo 1995 Catalog, Pages 2-4, "On My Way® Deluxe Rear Facing Infant Car Seat/Carrier/Rocker With Autobase" and "Travel Tandem® Rear Facing Infant Car Seat/Carrier/Rocker With Autobase".

Cosco Inc. 1996 Catalog, Page 2, "Arriva".

Evenflo 1997 Catalog, Pages 2-3, "On My Way Travel System" and "Joy Ride Travel System" Strollers.

Century Products 1997 Brochure, "Century® 4-in-1 System ProSport" Car Seat/Stroller. --

Signed and Sealed this

Sixth Day of March, 2001

Attest:

NICHOLAS P. GODICI

Attesting Officer    Acting Director of the United States Patent and Trademark Office